United States Patent [19]

Guerrini et al.

[11] Patent Number: 5,362,431

[45] Date of Patent: Nov. 8, 1994

[54] PROCESS FOR PREPARING SHAPED BODIES OF THERMOPLASTIC POLYMERS REINFORCED WITH LONG FIBRES

[75] Inventors: Gian L. Guerrini, Cernusco Sul Naviglio; Aurelio Savadori, Bellinzage Lombardo; Domingo Cutolo, Gessate; Ernesto Occhiello, Novara, all of Italy

[73] Assignee: Enichem S.p.A., Milan, Italy

[21] Appl. No.: 13,405

[22] Filed: Feb. 4, 1993

[30] Foreign Application Priority Data

Feb. 6, 1992 [IT] Italy .................. MI92 A 000226

[51] Int. Cl.$^5$ .............................. B29C 67/14
[52] U.S. Cl. ............................ 264/131; 264/136; 264/140; 264/174; 264/345; 427/195; 427/203; 427/366
[58] Field of Search ............... 264/131, 136, 140, 174, 264/257, 280, 345; 427/195, 203, 366, 375, 385.5

[56] References Cited

U.S. PATENT DOCUMENTS

| | | | |
|---|---|---|---|
| 2,877,501 | 3/1959 | Bradt | 264/DIG. 53 |
| 3,703,396 | 11/1972 | Lamanche et al. | 156/158 |
| 3,742,106 | 6/1973 | Price | 264/131 |
| 3,862,287 | 1/1975 | Davis | 264/131 |
| 4,699,579 | 10/1987 | Bourdon et al. | 264/174 |
| 4,713,139 | 12/1987 | Ganga | 264/131 |
| 4,743,413 | 5/1988 | Galichon | 264/136 |
| 5,206,085 | 4/1993 | Nakagara et al. | 264/131 |

FOREIGN PATENT DOCUMENTS

| | | |
|---|---|---|
| 0248384 | 12/1987 | European Pat. Off. . |
| 0322774 | 7/1989 | European Pat. Off. . |
| 0342080 | 11/1989 | European Pat. Off. . |
| 2031719 | 11/1970 | France . |
| 2085896 | 12/1971 | France . |
| 2600585 | 12/1987 | France ............... 264/136 |
| 2600585 | 12/1987 | France . |

OTHER PUBLICATIONS

Composites, vol. 30, No. 3, May–Jun. 1990, pp. 93–99, F. Lottiau, et al., "Composites Thermoplastiques A Fibres Longues De Renforcement, Leur Emploi En Injection Et Compression".

*Primary Examiner*—Jay H. Woo
*Assistant Examiner*—Robert B. Davis
*Attorney, Agent, or Firm*—Oblon, Spivak, McClelland, Maier & Neustadt

[57] ABSTRACT

Process for preparing shaped bodies of thermoplastic polymers by means of extrusion, injection, or spin molding of granules having a length within the range of from 2 to 100 mm, obtained by cutting a continuous calendered filament constituted by a bundle of fibres impregnated with a thermoplastic polymer in powder form and coated with an outer sheath constituted by a thermoplastic polymer which is the same as, or different from, the polymer which constitutes said powder, and having a melting point equal to or higher than the powder polymer.

20 Claims, No Drawings

PROCESS FOR PREPARING SHAPED BODIES OF THERMOPLASTIC POLYMERS REINFORCED WITH LONG FIBRES

The present invention relates to a process for preparing shaped bodies of thermoplastic polymer reinforced with long fibres.

More particularly, the present invention relates to a process for preparing shaped bodies by means of extrusion, injection molding or spin molding of thermoplastic polymeric blends reinforced with long fibres.

In many applications, hystorically dominated by articles of metal materials, the use is presently being proposed of composite materials which are constituted by a polymeric matrix and an inorganic reinforcer means, above all fiberglass or carbon fibres.

Both thermoplastic and thermosetting polymeric composites, reinforced with continuous fibres, resulted to be particularly suitable for applications in which the fabrication technology is pultrusion, compression molding or filament winding, because the mechanical properties which can be obtained in that way are very high. In fact, in these composites the matrix essentially acts in order to keep the fibres, which secure most of mechanical properties, bonded to each other.

Recently, continuous-fibre composites with thermoplastic matrix were successfully adopted, because they prevent typical problems of thermosetting polymers, such as the presence of solvents, with corresponding problems of environmental character, and impossibility of recycling them.

A particularly advantageous method in order to obtain continuous-fibre thermoplastic composites consists in impregnating a bundle of fibres with thermoplastic powders and covering said impregnated bundle with an also thermoplastic sheath, as reported in U.S. Pat. No. 4,614,678.

The resulting semi-finished article has the appearance of a flexible filament, particularly suitable for weaving operations and subsequent fabrication.

A further advantage of the just mentioned technique consists in the possibility of using, as the sheath and as the powder, two polymers which can be different from each other from both viewpoints of their molecular weight and their chemical nature, so as to optimize the end characteristics of the manufactured article.

Short-fibre composites, generally with fibres shorter than 2 mm, are, on the contrary, commonly used in applications for technical articles in which very high characteristics are not required. The most widespread molding technologies are injection molding, extrusion, and so forth.

Also long-fibre composites are available, in which the length of the fibres exceeds 2 mm, and generally is comprised within the range of from 2 to 150 mm. The mechanical performances which can be obtained with these materials are of an intermediate level, because they are lower than of continuous-fibre composites and higher than of short-fibre composites. In fact, it is well-known that long enough fibres can display nearly as good reinforcer characteristics as continuous fibres, as reported by M. G. Bader in the chapter "Reinforced thermoplastics" in the text "Handbook of Composites", Volume 4, editors A. Kelly and S. T. Mileiko, published by Elsevier, New York, 1983, because, even if the length of the fibres decreases during the processing step, such a long-fibre fraction remains as to make it possible considerably higher mechanical properties than of short-fibre composites, to be obtained.

Unfortunately, the use of long-fibre thermoplastic composites in the preparation of articles endowed with high physical-mechanical characteristics, requires special processing techniques in order to obtain a homogeneous distribution of the fibre in the end article of manufacture.

Aiming at simplifying these processing techniques, processes for preparing long-fibre thermoplastic composites in the form of semi-finished articles, to be used in injection molding, were proposed in the relevant technical literature.

In U.S. Pat. No. 3,862,287, disclosed is the preparation of long-fibre composites by causing unitary and continuous fibres to run through a fluid bed constituted by a thermoplastic polymer powder, with the fibres being consequently impregnated. The fibres are subsequently collected into a bundle, and are heated to such a temperature to cause the polymer to flow, with the same fibres being consequently coated.

The bundle of impregnated fibres with thermoplastic matrix is then cut into such portions as to allow the resulting material to be injection-molded.

An alternative method is disclosed in U.S. Pat. No. 4,559,262, according to which a bundle of fibres is caused to run through a bath constituted by a molten thermoplastic polymer, in a continuous process of melt pultrusion. The bundle is then cut into suitable portions for injection molding.

It should be observed that this process results to be critical, in that it requires the use of thermoplastic, preferably semi-crystalline, polymers having a lower viscosity than as is conventionally regarded as being suitable in order to obtain satisfactory mechanical properties.

The methods disclosed hereinabove make it possible for semi-finished articles to be obtained which are easily processed in extruders and suitable for injection molding, thanks to the intimate distribution of the polymer on each fibre of the reinforcer material also when the latter is a long fibre, but are unsuitable for preparing, at least with simple, hence commercially interesting technologies, composites or semi-finished articles in which the thermoplastic matrix consists of two heterogeneous polymers.

The present Applicant has found now a process in order to prepare articles of long-fibre reinforced plastic materials reinforced which, by using special long-fibre composites in which the thermoplastic matrix is a blend of two polymers, makes it possible the drawbacks which affect the prior art to be overcome.

Therefore, the subject-matter of the present invention is a process for preparing shaped bodies by extrusion, injection molding, or spin molding of composites, constituted by thermoplastic polymeric blends reinforced with long fibres, obtained by means of a process which comprises:

a) impregnating, with a thermoplastic polymer powder, an open bundle of continuous, parallel, fibres;

b) getting together the so impregnated fibres, in order to form a continuous filament;

c) coating the resulting powder-impregnated filament with a continuous outer sheath constituted by a thermoplastic polymer equal to or different from, the polymer which constitutes said powder and having the same, or a higher, melting point than that;

d) calendering the resulting filament at a temperature approximately equal to the polymer powder softening temperature;

e) cutting the calendered filament into granules having a length comprised within the range of from 2 to 100 mm.

In the process according to the present invention, any types of fibres can be used. Fibres of inorganic nature, such as E or S fiberglass or carbon fibres, or fibres of organic character, such as poly(p-phenylene terephthalamide) fibres.

In an analogous way, for the sheath and the powder used in order to impregnate the fibres, any kinds of thermoplastic polymers can be used. Illustrative, non-limitative examples are: polyethylene; copolymers of polyethylene with vinyl acetate; polypropylene; polystyrene; styrene copolymers, such as ABS and SAN; polymethacrylates, such as poly(methyl-methacrylate); polyamides, such as polyamide 6 (PA-6), polyamide 6,6 (PA-6,6), polyamide 4,6 (PA-4,6), polyamide 12 (PA-12), polyamide 11 (PA-11), and so forth; aliphatic polyester resins, such as poly(ethylene terephthalate), poly(butylene terephthalate), poly(ethylene naphthalene dicarboxylate), and so on; aromatic polyester resins, such as polyarylates, thermotropic liquid-crystal polyesters, and so forth; polycarbonates; polyether imides; polysulfones; polyether sulfones; poly(vinyl chloride); poly(vinylidene chloride); poly(vinyl fluoride); poly(vinylidene fluoride); polytetrafluoroethylene; ethylene-trichlorofluoroethylene copolymers; polyacetals; and so forth.

The ratio of the matrix to the fibre can be adjusted both by operating on the percent powder level, and by adjusting the thickness of the sheath. However, operating with a fibre level higher than 20% by volume, generally comprised within the range of from 30 to 70% by volume, is preferred.

The steps from (a) to (c) of the process according to the present invention can be carried out according to as disclosed in U.S. Pat. No. 4,614,678, or in European Patent 190,522, the contents of which are to be regarded as an integrating part of the present invention.

The polymers of both the sheath and the powder can be used in their pristine state, or mixed with any suitable additives in order to facilitate the process. In particular, examples of such additives are the heat stabilizers and the lubricants used in order to facilitate the subsequent molding process.

The calendering and cutting process aims at obtaining granules having such characteristics as to make it possible them to be molded by means of such traditional technologies as injection molding, extrusion or spin molding.

In particular, the filament calendering is preferably carried out in such a way as to yield a semi-finished article having a bulk specific gravity higher than 0.5 g/cc, preferably comprised within the range of from 0.6 to 1.5 g/cc.

The calendering process is carried out, as known, by means of a pressure application associated with a temperature increase. The pressure application can be accomplished by means of two or more rollers between which the filament is caused to run, whilst the temperature increases can be obtained by means of well-known methods in the art, for example by means of irradiation with infrared lamps or by electrical resistors which heat the surface of the rollers.

The temperature is increased up to values close to the powder polymer softening point. In the case of amorphous polymers, the temperature of the semi-finished article is increased up to value higher than the glass transition temperature, by a high enough increment in order to cause the powder to flow on the fibres. On the contrary, when crystalline or semi-crystalline are used, reaching higher temperatures than the melting point is preferable.

As regards the cutting, any types of cutting units can be used in the process according to the present invention. The cutting process can be carried out online with the calendering step, or it may be carried out separately, according to the process requirements. The size of the pellet is comprised within the range of from 2 to 100 mm, preferably of from 2 to 15 mm, in order to obtain a pellet which is endowed with good processability characteristics according to the techniques mentioned hereinabove (injection, extrusion and spin molding) and, simultaneously, long enough fibres in order to have a long-fibre composite.

In the following, some illustrative examples are reported which in no way do limit the scope of the present invention.

EXAMPLE 1

Continuous filaments were prepared by using the same procedure as disclosed in example 1 of U.S. Pat. No. 4,614,678.

For the sheath, a polyamide designated "RILSAN", manufactured by Atochem was used, and as the polymer powder, a polyamide-6 designated Orgasol, also supplied by Atochem, was used.

As the fiberglass, a product manufactured by Owens Corning Fiberglass (OCF), with a count of 2400 tex, was used. The ratio, by weight, of sheath:powder:fibre was of 20:20:60.

The resulting semi-finished product was caused to run through an oven heated by means of I. R. lamps at 300° C., so as to cause the polymer powder to melt, and then was calendered and collected on a spindle.

The resulting product was cut by using a cutting unit manufactured by ABR of Besano (Varese).

Ten mm long granules were obtained.

The bulk specific gravity of the material was determined according to ASTM D1895 and resulted to be of 0.7 g/cc.

EXAMPLE 2

The same procedure as of example 1 was repeated, but using OCF fibres of 4800 tex, with the weight ratio of sheath:polymer powder:fibre being kept at 20:20:60.

EXAMPLE 3

The granules prepared by means of the method disclosed in example 1 were injection-molded by using an injection press manufactured by Metalmeccanica Plast, model Pentatron 65/185, equipped with a screw of 34 mm of diameter.

The molding was carried out with a temperature profile of from 265° to 295° C., at a revolution speed of 20 revolutions per minute (rpm). Specimens were obtained according to ASTM D638M and were characterized by means of mechanical tensile tests. A hydraulic test machine manufactured by MTS, model 312.31, was used.

The deformations were detected by means of a strain gauge manufactured by MTS, model 632.25 C-20, with a measurement base of 50 mm.

The results obtained are reported in the following table. Values of tensile modulus are obtained which are decidedly higher than those reported for analogous materials reinforced with short fibres, and close to those displayed by continuous-fibre composites.

EXAMPLE 4

The procedure of example 3 was repeated, with the revolution speed being changed from 20 to 50 rpm.

The results of the mechanical testing are reported in the table.

EXAMPLE 5

The procedure of example 3 was repeated, with the revolution speed being changed from 20 to 100 rpm.

The results of the mechanical testing are reported in the table.

COMPARISON EXAMPLE

Continuous filaments were prepared by using the same procedure as disclosed in example 1 of U.S. Pat. No. 4,614,678.

For the sheath, a high-density polyethylene designated Eraclene PG55, manufactured by Enichem Polimeri of Milan, was used, and as the polymer powder, a polyamide-6 designated Orgasol, also supplied by Atochem, was used.

As the fiberglass, a product manufactured by Owens Corning Fiberglass (OCF), of 2400 tex, was used. The ratio, by weight, of sheath:powder:fibre was of 20:20:60.

The resulting semi-finished articles were not calendered and they were directly cut by using the already cited ABR shearing unit.

Granules of 10 mm were obtained, with reported specific gravity of 0.36 g/co.

Then, injection molding experiments were carried out by using the same equipment and operating conditions as disclosed in example 3. However, no specimens could be obtained owing to feed difficulties due to the too low specific gravity of the material.

TABLE

Tensile modulus (E), tensile strength (r) and elongation at break (e) of the specimens of example 3–5; in brackets the standard deviation is reported.

| Specimen | E (Mpa) | r (Mpa) | e % |
|---|---|---|---|
| 3 | 15.4 (0.8) | 168 (6) | 1.4 (0,04) |
| 4 | 17.2 (0.6) | 164 (5) | 1.2 (0.04) |
| 5 | 15.6 (0.3) | 168 (5) | 1.4 (0.10) |

We claim:

1. A method of forming long-fiber composite thermoplastic granules for use in extrusion, injection, or spin molding which comprises:
   (a) impregnating, with a thermoplastic polymer powder, an open bundle of continuous, parallel, fibers;
   (b) forming a continuous filament of said fibers;
   (c) coating said continuous filament with a continuous outer sheath comprising a thermoplastic polymer;
   (d) calendering said filament at a temperature sufficient to cause the thermoplastic polymer powder to flow, without melting said continuous outer sheath; and
   (e) cutting said calendered filament into granules having a length in the range of from 2 to 100 mm.

2. The method of claim 1, wherein said thermoplastic polymer powder is selected from the group consisting of polyethylene, copolymers of ethylene with vinyl acetate, polypropylene, polystyrene, styrene copolymers, polymethacrylates, polyamides, aliphatic polyester resins, aromatic polyester resins, polycarbonates, polyether imides, polysulfones, polyether sulfones, poly(vinyl chloride), poly(vinylidene chloride), poly(vinyl fluoride), poly(vinylidene fluoride), polytetrafluoroethylene, ethylene-trichlorofluoroethylene copolymers and polyacetals.

3. The method of claim 2, wherein said thermoplastic polymer powder is selected from the group consisting of ABS, SAN, poly(methylmethacrylate), polyamide 6, polyamide 6,6, polyamide 4,6, polyamide 12, polyamide 11, poly(ethylene-terephthalate), poly(butylene terephthalate), poly(ethylene naphthalene dicarboxylate), polyarylates, and thermotropic liquid-crystal polyesters.

4. The method of claim 1, wherein the ratio of said thermoplastic polymer powder and said thermoplastic polymer of said continuous outer sheath, to fiber, is higher than 20% by volume.

5. The method of claim 1, wherein said granules have a bulk specific gravity larger than 0.5 g/cc.

6. The method of claim 1, wherein the melting point of said thermoplastic polymer of said continuous outer sheath is greater than the melting point of said thermoplastic polymer powder.

7. The method of claim 1, wherein said granules have a length in the range of from 2 to 15 mm.

8. The method according to claim 2, wherein the ratio of said thermoplastic polymer powder and said thermoplastic polymer of said continuous outer sheath, to fiber, is larger than 20% by volume.

9. The method of claim 2, wherein said granules have a bulk specific gravity larger than 0.5 g/cc.

10. The method of claim 2, wherein said granules have a length in the range of from 2 to 15 mm.

11. The method of claim 1, wherein said thermoplastic polymer of said continuous outer sheath is different from said thermoplastic polymer powder.

12. The method of claim 1, wherein said fibers are selected from the group consisting of fiberglass, carbon fibers, and poly(p-phenyleneterephthalamide) fibers.

13. The method of claim 1, wherein the ratio of said thermoplastic polymer powder and said thermoplastic polymer of said continuous outer sheath, to fiber, is in the range of from 30% to 70% by volume.

14. The method of claim 1, wherein said granules have a bulk specific gravity within the range of from 0.6 to 1.5 g/cc.

15. The method of claim 11, wherein said calendering temperature is above the melting temperature of said thermoplastic polymer powder.

16. The method of claim 1, wherein said thermoplastic polymer of said continuous outer sheath is selected from the group consisting of polyethylene, copolymers of ethylene with vinyl acetate, polypropylene, polystyrene, styrene copolymers, polymethacrylates, polyamides, aliphatic polyester resins, aromatic polyester resins, polycarbonates, polyether imides, polysulfones, polyether sulfones, poly(vinyl chloride), poly(vinylidene chloride), poly(vinyl fluoride), poly(vinylidene fluoride), polytetrafluoroethylene, ethylene-trichlorofluoroethylene copolymers and polyacetals.

17. The method of claim 16, wherein said thermoplastic polymer of said continuous outer sheath is selected from the group consisting of ABS, SAN, poly(methylmethacrylate), polyamide 6, polyamide 6,6, polyamide 4,6, polyamide 12, polyamide 11, poly(ethylene-terephthalate), poly(butylene terephthalate), poly(ethylene naphthalene dicarboxylate), polyarylates, and thermotropic liquid-crystal polyesters.

18. The method according to claim 16, wherein the ratio of said thermoplastic polymer powder and said thermoplastic polymer of said continuous outer sheath, to fiber, is larger than 20% by volume.

19. The method of claim 16, wherein said granules have a bulk specific gravity larger than 0.5 g/cc.

20. The method of claim 16, wherein said granules have a length in the range of from 2 to 15 mm.

* * * * *

UNITED STATES PATENT AND TRADEMARK OFFICE
CERTIFICATE OF CORRECTION

PATENT NO.   : 5,362,431
DATED        : November 8, 1994
INVENTOR(S)  : Gian L. GUERRINI, et al.

It is certified that error appears in the above-indentified patent and that said Letters Patent is hereby corrected as shown below:

On the title page, Item [75], the second inventor's city is spelled incorrectly. It should read:

--Bellinzago Lombardo--

Signed and Sealed this

Seventh Day of March, 1995

*Attest:*

BRUCE LEHMAN

*Attesting Officer*    *Commissioner of Patents and Trademarks*